Feb. 7, 1933. M. R. VIKLA 1,896,925
TRAPPER AND RETAINER FOR BEE SWARMS AND SEPARATOR FOR DRONES AND QUEENS
Filed Nov. 9, 1931 3 Sheets-Sheet 3
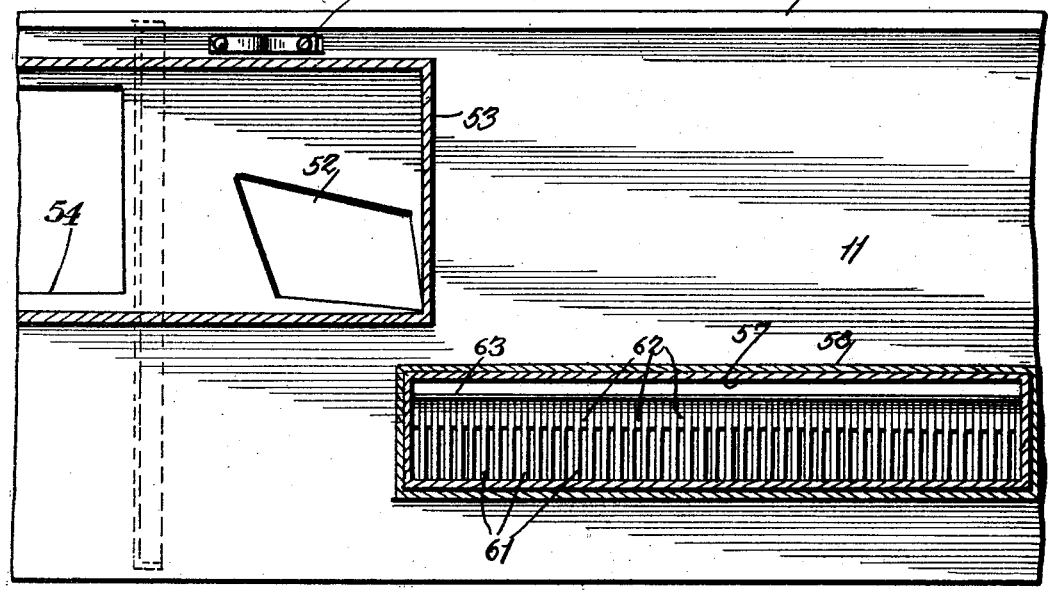
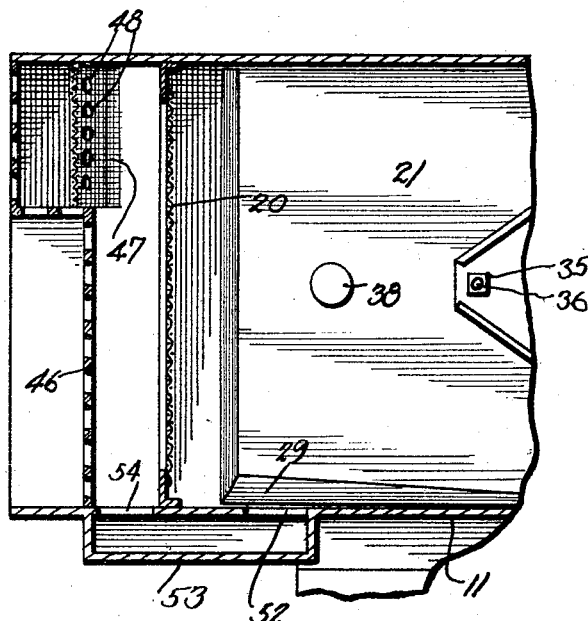
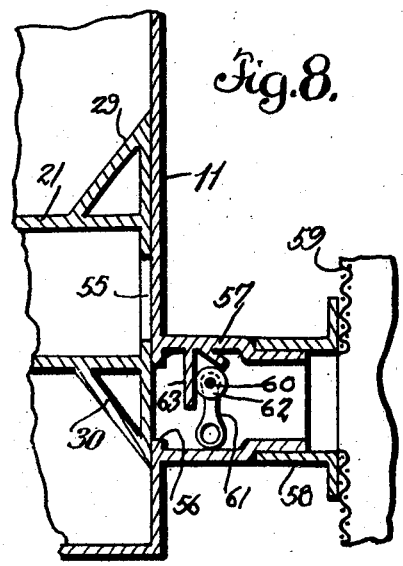
Mathias R. Vikla, Inventor
By Bryant & Lowry
Attorneys Patented Feb. 7, 1933

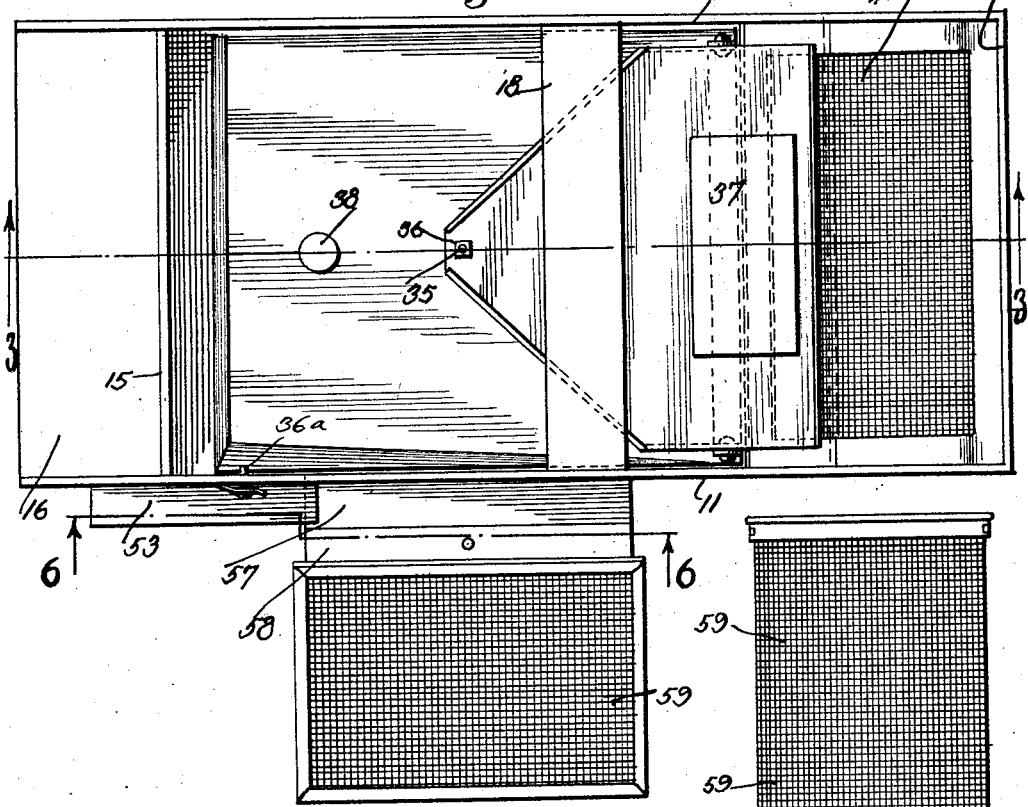
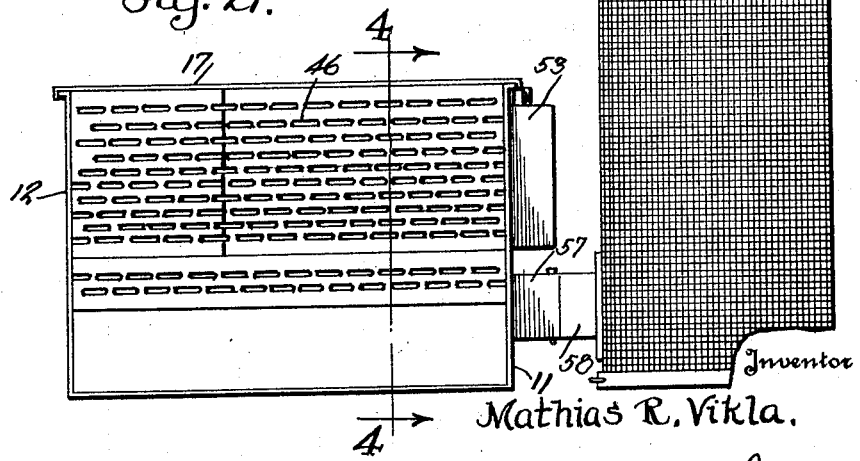

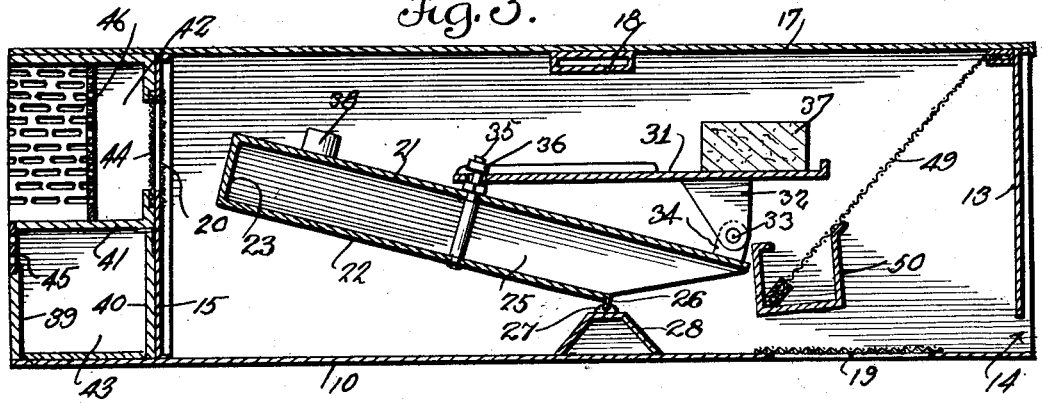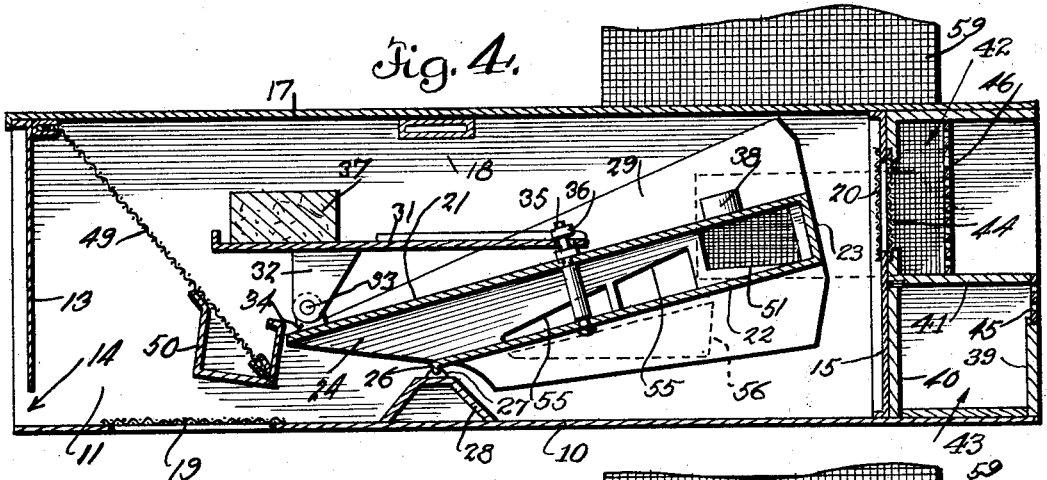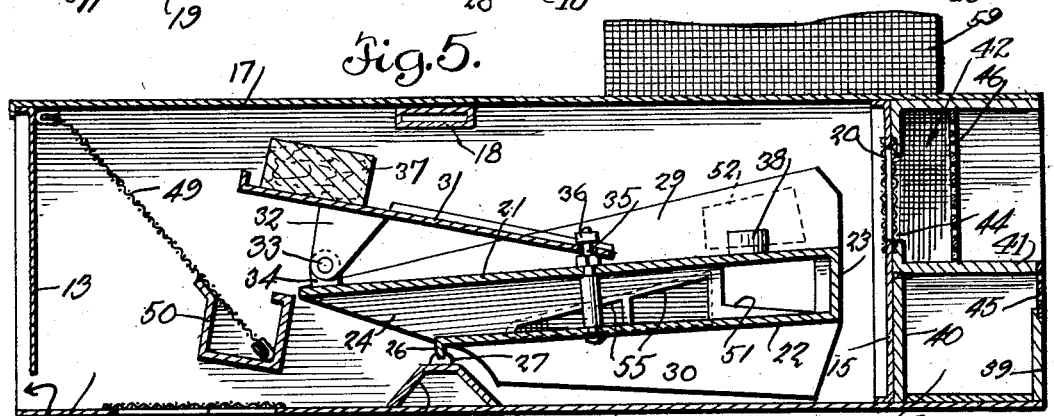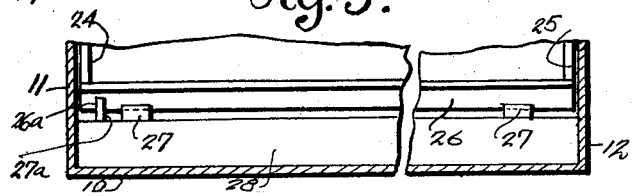

1,896,925

UNITED STATES PATENT OFFICE

MATHIAS R. VIKLA, OF LONSDALE, MINNESOTA

TRAPPER AND RETAINER FOR BEE SWARMS AND SEPARATOR FOR DRONES AND QUEENS

Application filed November 9, 1931. Serial No. 573,939.

This invention relates to certain new and useful improvements in a trapper and retainer for bee swarms, and separator for drones and queens.

The primary object of the invention is to provide a combined bee swarm trapper, retainer, and separator adapted for association with a beehive and is constructed in a manner to permit normal passage of bees from the hive therethrough to the atmosphere and embodies mechanism automatically operable in the presence of bee swarming to prevent the escape of the bees to the atmosphere and to direct the travel of swarming bees into a retainer.

A further object of the invention is to provide a bee swarm trapper, retainer, and separator of the foregoing character that is constructed to permit free circulation of air therethrough to the hive and which will not in any respect interfere with the work of the bees but automatically operating to prevent the escape of swarming bees therethrough.

With the above and other objects in view that will become apparent as the nature of the invention is better understood, the same consists in the novel form, combination, and arrangement of parts hereinafter more fully described, shown in the accompanying drawings and claimed.

In the drawings, forming a part of this application and to which reference is had by like reference characters designating corresponding parts throughout the several views;

Figure 1 is a top plan view of a combined bee swarm trapper, retainer, and separator constructed in accordance with the present invention with the entrance chamber and cover removed to illustrate the counterbalance trip chamber therein, Figure 2 is an end elevational view showing the perforated wall of the entrance chamber and the laterally disposed screen retainer, Figure 3 is a vertical longitudinal sectional view taken on line 3—3 of Figure 1 showing the trip chamber in its normally balanced position, Figure 4 is a vertical longitudinal sectional view taken on line 4—4 of Figure 2 showing communicating openings in a side wall of the trip chamber and casing that lead to the entrance chamber.

Figure 5 is a vertical longitudinal sectional view, similar to Figure 4, showing the trip chamber overbalanced by a bee swarm with communication between the trip and entrance chambers cut off and a passage-way to the retainer opened, Figure 6 is a vertical longitudinal sectional view taken on line 6—6 of Figure 1 showing trap doors in the passage way between the trip chamber and screen retainer, Figure 7 is a horizontal detail sectional view showing the laterally disposed passage way between the trip and entrance chambers, Figure 8 is an enlarged detail sectional view showing the trap doors mounted for swinging movement in one direction only, and Figure 9 is a detail sectional view showing means for preventing side movement of the trip chamber in the casing.

Referring more in detail to the accompanying drawings, there is illustrated a bee swarm trapper, retainer, and separator comprising an elongated housing or casing having a bottom wall 10, side walls 11 and 12, an end wall 13 spaced at its lower end from the bottom wall 10 to provide a passage 14 while the other end wall 15 is set inwardly of the end of the casing as shown in Fig. 1 to provide a space 16 for the reception of an entrance chamber to be presently described. The open upper side of the casing is closed by a removable cover 17 supported on the upper edges of the side and end walls and further braced intermediate its ends by the cross bar 18. To promote the circulation of fresh air through the casing, the bottom wall 10 has a screened opening 19 therein while the end wall 15 is provided with a screened opening 20.

A trip chamber is pivotally supported within the casing and includes upper and lower walls 21 and 22 closed by an end wall 23 adjacent the casing wall 15 with side walls 24 and 25, the other end of the trip chamber being opened as illustrated in Figures 3 to 5. A transversely extending pivot flange 26 is carried by the bottom wall 22 of the trip chamber at the open end thereof and said pivot flange 26 is engaged with supporting blocks 27 rising from a transversely extending upstanding support 28 carried by the bottom wall 10 of the casing. The trip chamber during its balancing or pivotal movements is of a width to cause the side walls 24 and 25 thereof to move in proximity of the side walls 11 and 12 of the casing to maintain correct position and pivotal movement thereof and said trip chamber at the side thereof adjacent the side wall 24 carries upper and lower extension plates 29 and 30 respectively that move in proximity of the side wall 11 of the casing. To prevent lateral movement of the trip chamber in the casing, one end of the pivot flange 26 is slotted as at 26ª and is received on the key 27ª rising from the support 28 as shown in Figure 9. Counterbalancing means for the trip chamber includes a plate arm 31 carrying depending edge ears 32 that are pivotally connected as at 33 to upstanding lugs 34 carried by the top wall 21 of the trip chamber adjacent the open end. The other end of the plate arm 31 is attached to the bolt 35 carried by the trip chamber and is adjustably held in position by the nut 36. To cause the trip chamber to assume the position illustrated in Figures 3 and 4, a weight 37 is mounted upon the outer end of plate arm 31 while a second weight 38 is mounted upon a marked or designated spot on the top wall 21 of the trip chamber adjacent the closed end of the latter and by shifting the weight 37, the trip chamber is brought into slightly overbalanced position, finer adjustments thereof being accomplished by operating the nut 36 that retains one end of the plate arm. The overbalanced position of the trip chamber is limited by the spring pressed stop pin 36ª projecting inwardly through the side wall 11 of the casing as shown in Figures 1 and 6. When this position for the trip chamber has been attained, the weight member 38 is removed. The weight of the member 38 is slightly less than is the required weight to be produced by the swarming bees for operating or tilting the trip chamber from its set position to cut off passage through the casing to the atmosphere.

The bee entrance chamber mounted in the open area 16 at one end of the casing comprises front and rear walls 39 and 40 with a cross partition 41 dividing the entrance chamber into upper and lower compartments 42 and 43, the rear wall of the upper compartment having a screened opening 44 therein registering with the screened opening 20 in the end wall 15 of the casing. The lower compartment 43 is closed, except for a ventilating grid 45 that allows the worker bees to pass out but prevents the queens and drones from escaping, while a grid plate 46 of angle formation as illustrated in Figure 7 forms the front wall of the upper compartment 42, the openings therein being of a size to permit unobstructed passage therethrough of the bees with the exception of the drones and the queen. The upper compartment 42 at the angle end of the grid plate 46 as illustrated in Figure 7 is in communication with the lower compartment 43 by means of an opening provided at the horizontal partition 41, said opening being covered by a fine mesh screen 47 having relatively large openings 48 therein of a size to permit passage of queen and drone bees therethrough for trapping in the lower compartment 43. The wall 40 constitutes a door permitting access to the lower compartment for removing the drones and queen bees.

The casing has the end wall 13 thereof placed adjacent a beehive with the opening 14 at the lower end of the casing in direct communication with the entrance to the hive so that when bees leave the hive they are compelled to enter the casing. To direct the bees into the space between the upper and lower walls 21 and 22 of the trip chamber, there is provided an angularly disposed screen plate 49 extending downwardly from the upper edge of the casing and supported at its lower end in a transversely extending channel member 50 supported at its ends by the side walls 11 and 12 of the casing, the channel member being spaced from the bottom wall 10 of the casing so that the bees in their travel are directed into the trip chamber.

The side wall 24 of the trip chamber adjacent the closed end thereof is provided with an opening 51 that normally registers with an opening 52 in the side walls 11 of the casing as shown in Figures 4, 5, 6 and 7, the side wall 11 of the casing carrying an external housing 53 extending longitudinally of the casing and with which housing the upper compartment 42 of the bee entrance chamber is in communication by means of the opening 54.

During normal exit of the bees from the hive, they pass into the casing through the opening 14, travel over the bottom wall 22 of the trip chamber, pass through the openings 51 and 52 to enter the housing 53 and then pass through the opening 54 to enter the upper compartment 42 of the entrance chamber, The bees pass outwardly through the grid plate 46 while the larger queen and drone bees pass through the openings 48 in the screen 47 to be trapped in the lower compartment 43 of the entrance chamber. The bees reenter the hive by traveling in a reverse direction, first entering the entrance chamber through the grid plate 46 and traveling through the casing for return to the hive.

When the bees swarm, they gather upon the bottom wall 22 of the trip chamber which is overbalanced by the weight thereof with the result that the trip chamber moves on its pivot flange 26 with the closed end thereof lowered, the upper side wall 29 then closing the opening 52 to prevent the passage of the bees to the entrance chamber. The side wall 24 of the entrance chamber has additional openings 55 therein that are brought into registration with the opening 56 in the side wall 11 of the casing to permit the lateral escape of the bees from the casing to enter a trap and retainer. The opening 56 in the side wall 11 of the casing as shown in Figures 1, 2, 6 and 8 is surrounded by an outwardly directed frame 57 upon which a frame 58 that carries a screen cage 59 is telescopically mounted. A series of trap doors are pivotally suspended within the frame 57 and include a rod 60 supported at its ends in the ends of the frame adjacent the upper end of the latter for the support of trap doors in the form of links 61 pivotally supported on the rod 60 and spaced by washers 62, an abutment 63 depending from the upper side of the frame cooperating with the trap door links to prevent pivotal movement thereof toward the casing but permitting free pivotal movement in the opposite direction toward the screen cage 59. The trap door links are of a weight to be easily operated by the contact of bees therewith so that little if any hindrance will be offered the bees when swarming against their passage from the casing to the screen trap 59, the trap door links operating to prevent the return of the swarming bees to the casing.

From the above detailed description of the invention, it is believed that the construction and use thereof will at once be apparent, it being noted that in view of the screened areas of the casing, the same may, if desired, be permanently associated with a beehive without obstructing circulation of fresh air through the hive and that the bees in their normal work readily pass through the casing to the atmosphere without being trapped. However, when the bees begin to swarm and large quantities gather within the trip chamber, the latter is automatically operated to prevent the escape of swarming bees to the atmosphere with their passage directed to a trap chamber. After the bees have been trapped in the screened chamber and the trip chamber is restored to its normal position, the trapped bees can not reenter the casing as the trip door links 61 are a bar to such passage.

While there is herein shown and described the preferred embodiment of the invention, it is understood that minor changes may be made therein such as will fall within the scope of the invention as claimed.

I claim:

1. In a trapper and retainer for bee swarms and separator for drones and queens, a casing, a trip chamber therein for the passage of bees through the casing, said trip chamber being pivotally mounted and overbalancing in the presence of a bee swarm to prevent normal passage of bees through the casing.

2. In a trapper and retainer for bee swarms and separator for drones and queens, a casing, a trip chamber therein, a trapper and retainer in communication with the casing, said trip chamber normally closing the communication and being movable by bee swarms to be placed in communication with the trapper and retainer.

3. In a trapper and retainer for bee swarms and separator for drones and queens, a casing, a balanced trip chamber mounted therein and constituting a passage through the casing for bees when in balanced position and a trapper and retainer carried by the casing to be placed in communication with the trip chamber when the latter is overbalanced by a bee swarm to cut off passage through the casing.

4. In a trapper and retainer for bee swarms and separator for drones and queens, a casing, a trip chamber therein for the passage of bees through the casing, said trip chamber being pivotally mounted and overbalancing in the presence of a bee swarm to prevent normal passage of bees through the casing, the trip chamber comprising a top wall and a bottom wall, a pivot support for one edge of the bottom wall and counterbalancing means carried by the top wall.

5. In a trapper and retainer for bee swarms and separator for drones and queens, a casing, a trip chamber therein, a trapper and retainer in communication with the casing, said trip chamber normally closing the communication and being movable by bee swarms to be placed in communication with the trapper and retainer, the trip chamber comprising a top wall and a bottom wall, a pivot support for one edge of the bottom wall and counterbalancing means carried by the top wall.

6. In a trapper and retainer for bee swarms and separator for drones and queens, a casing, a balanced trip chamber mounted therein and constituting a passage through the casing for bees when in balanced position and a trapper and retainer carried by the casing to be placed in communication with the trip chamber when the latter is overbalanced by a bee swarm to cut off passage through the casing, the trip chamber comprising a top wall and a bottom wall, a pivot support for one edge of the bottom wall and a counterbalancing means carried by the top wall.

7. In a trapper and retainer for bee swarms and separator for drones and queens, a casing, a trip chamber therein for the passage of bees through the casing, said trip chamber being pivotally mounted and overbalancing in the presence of a bee swarm to prevent normal passage of bees through the casing, the trip chamber comprising a top wall and a bottom wall, a pivot support for one edge of the bottom wall and counterbalancing means carried by the top wall, an entrance chamber at one end of the casing normally in communication with the trip chamber with communication therewith cut off when the trip chamber is in overbalanced position.

8. In a trapper and retainer for bee swarms and separator for drones and queens, a casing, a trip chamber therein, a trapper and retainer in communication with the casing, said trip chamber normally closing the communication and being movable by the weight of bee swarms to be placed in communication with the trapper and retainer, the trip chamber comprising a top wall and a bottom wall, a pivot support for one edge of the bottom wall and counterbalancing means carried by the top wall, an entrance chamber at one end of the casing normally in communication with the trip chamber with communication therewith cut off when the trip chamber is in overbalanced position.

9. In a trapper and retainer for bee swarms and separator for drones and queens, a casing, a balanced trip chamber mounted therein and constituting a passage through the casing for bees when in balanced position, a trapper and retainer carried by the casing to be placed in communication with the trip chamber when the latter is overbalanced by a bee swarm to cut off passage through the casing, the trip chamber comprising a top wall and a bottom wall, a pivot support for one edge of the bottom wall and a counterbalancing means carried by the top wall, an entrance chamber at one end of the casing normally in communication with the trip chamber with communication therewith cut off when the trip chamber is in overbalanced position.

10. In a trapper and retainer for bee swarms and separator for drones and queens, a casing, a trip chamber therein for the passage of bees through the casing, said trip chamber being pivotally mounted and overbalancing in the presence of a bee swarm to prevent normal passage of bees through the casing, the trip chamber comprising a top wall and a bottom wall, a pivot support for one edge of the bottom wall, counterbalancing means carried by the top wall, an entrance chamber at one end of the casing normally in communication with the trip chamber with communication therewith cut off when the trip chamber is in overbalanced position, said entrance chamber being divided into separate compartments, a grid plate closure for one compartment and a screen partition between the compartments having openings therein for the passage of the queen bee and the drone bees from the upper compartment to the lower compartment.

11. In a trapper and retainer for bee swarms and separator from dones and queens, a casing, a trip chamber therein, a trapper and retainer in communication with the casing, said trip chamber normally closing the communication and being movable by bee swarms to be placed in communication with the trapper and retainer, the trip chamber comprising a top wall and a bottom wall, a pivot support for one edge of the bottom wall, counterbalancing means carried by the top wall, an entrance chamber at one end of the casing normally in communication with the trip chamber with communication therewith cut off when the trip chamber is in overbalanced position, said entrance chamber being divided into separate compartments, a grid plate closure for one compartment and a screen partition between the compartments having openings therein for the passage of the queen bee and the drone bees from the upper compartment to the lower compartment.

12. In a trapper and retainer for bee swarms and separator for drones and queens, a casing, a balanced trip chamber mounted therein and constituting a passage through the casing for bees when in balanced position, a trapper and retainer carried by the casing to be placed in communication with the trip chamber when the latter is overbalanced by a bee swarm to cut off passage through the casing, the trip chamber comprising a top wall and a bottom wall, a pivot support for one edge of the bottom wall, a counterbalancing means carried by the top wall, an entrance chamber at one end of the casing normally in communication with the trip chamber with communication therewith cut off when the trip chamber is in overbalanced position, said entrance chamber being divided into separate compartments, a grid plate closure for one compartment and a screen partition between the compartments having openings therein for the passage of the queen bee and the drone bees from the upper compartment to the lower compartment.

13. In a trapper and retainer for bee swarms and separator for drones and queens, a casing, a trip chamber therein for the passage of bees through the casing, said trip chamber being pivotally mounted and overbalancing in the presence of a bee swarm to prevent normal passage of bees through the casing, the trip chamber comprising a top wall and a bottom wall, a pivot support for one edge of the bottom wall, counterbalancing means carried by the top wall, an entrance chamber at one end of the casing normally in communication with the trip chamber with communication therewith cut off when the trip chamber is in overbalanced position, screened sections in the casing to promote air circulation therethrough and a screen partition in the casing to direct the bees into the trip chamber.

14. In a trapper and retainer for bee swarms and separator for drones and queens, a casing, a trip chamber therein, a trapper and retainer in communication with the casing, said trip chamber normally closing the communication and being movable by bee swarms to be placed in communication with the trapper and retainer, the trip chamber comprising a top wall and a bottom wall, a pivot support for one edge of the bottom wall, counterbalancing means carried by the top wall, an entrance chamber at one end of the casing normally in communication with the trip chamber with communication therewith cut off when the trip chamber is in overbalanced position, screened sections in the casing to promote air circulation therethrough and a screen partition in the casing to direct the bees into the trip chamber.

15. In a trapper and retainer for bee swarms and separator for drones and queens, a casing, a balanced trip chamber mounted therein and constituting a passage through the casing for bees when in balanced position, a trapper and retainer carried by the casing adapted to be placed in communication with the trip chamber when the latter is overbalanced by a bee swarm to cut off passage through the casing, the trip chamber comprising a top wall and a bottom wall, a pivot support for one edge of the bottom wall, a counterbalancing means carried by the top wall, an entrance chamber at one end of the casing normally in communication with the trip chamber with communication therewith cut off when the trip chamber is in overbalanced position, screened sections in the casing to promote air circulation therethrough and a screen partition in the casing to direct the bees into the trip chamber.

16. In a trapper and retainer for bee swarms and separator for drones and queens, a casing, a trip chamber therein for the passage of bees through the casing, said trip chamber being pivotally mounted and overbalancing in the presence of a bee swarm to prevent normal passage of bees through the casing, the trip chamber comprising a top wall and a bottom wall, a pivot support for one edge of the bottom wall, counterbalancing means carried by the top wall and means co-acting with the pivotal support for the trip chamber preventing lateral movement of the trip chamber in the casing.

17. In a trapper and retainer for bee swarms and separator for drones and queens, a casing, a trip chamber therein for the passage of bees through the casing, said trip chamber being pivotally mounted and overbalancing in the presence of a bee swarm to prevent normal passage of bees through the casing, the trip chamber comprising a top wall and a bottom wall, a pivot support for one edge of the bottom wall, counterbalancing means carried by the top wall, means co-acting with the pivotal support for the trip chamber preventing lateral movement of the trip chamber in the casing and means carried by the casing for limiting pivotal movement of the trip chamber in its direction toward set position.

18. In a trapper and retainer for bee swarms and separator for drones and queens, a casing, a trip chamber therein, a trapper and retainer in communication with the casing and said trapper chamber normally closing the communication and being movable by bee swarms to be placed in communication with the trapper and retainer, a trap door in the passageway between the casing and the trapper comprising a plurality of pivotally suspended link members opening in the direction toward the trapper and means to prevent pivotal movement of the trap door links toward the casing beyond a vertical line whereby bees in the trapper are prevented from return passage to the trip chamber and casing.

19. In a trapper and retainer for bee swarms and separator for drones and queens, a casing, a balanced trip chamber mounted therein and constituting a passage through the casing for bees when in balanced position, a trapper and retainer carried by the casing to be placed in communication with the trip chamber when the latter is overbalanced by a bee swarm to cut off passage through the casing, a trap door in the passageway between the casing and the trapper comprising a plurality of pivotally suspended link members opening in the direction toward the trapper and means to prevent pivotal movement of the trap door links toward the casing beyond a vertical line whereby bees in the trapper are prevented from return passage to the trip chamber and casing.

20. In a trapper and retainer for bee swarms and separator for drones and queens, a casing, a trip chamber therein, a trapper and retainer in communication with the casing and said trip chamber normally closing the communication and being movable by bee swarms to be placed in communication with the trapper and retainer, the trip chamber comprising a top wall and a bottom wall, a pivot support for one edge of the bottom wall, counterbalancing means carried by the top wall, a trap door in the passageway between the casing and the trapper comprising a plurality of pivotally suspended link members opening in the direction toward the trapper and means to prevent pivotal movement of the trap door links toward the casing beyond a vertical line whereby bees in the trapper are prevented from return passage to the trip chamber and casing.

In testimony whereof I affix my signature.

MATHIAS R. VIKLA.